Aug. 15, 1950 M. P. JANISCH 2,519,048
FISHING LURE
Filed Oct. 11, 1946
Fig. 1.
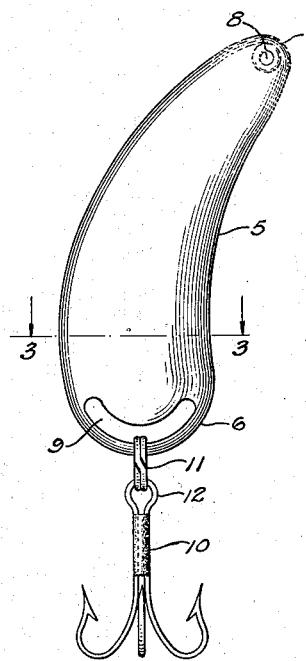
Fig. 2.
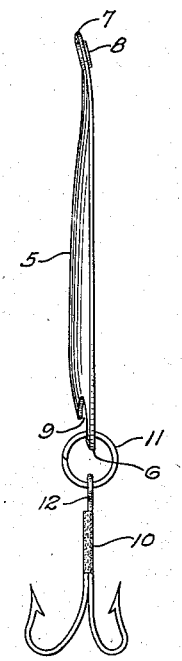
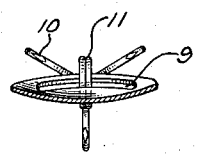
Fig. 3.
INVENTOR.
Maximillian P. Janisch,
BY
Morsell & Morsell
ATTORNEYS.

Patented Aug. 15, 1950

2,519,048

UNITED STATES PATENT OFFICE 2,519,048

FISHING LURE

Maximillian P. Janisch, Milwaukee, Wis., assignor of one-third to Bride B. Janisch, Milwaukee, Wis., and one-third to Myra J. Hess, Los Angeles, Calif.

Application October 11, 1946, Serial No. 702,803

3 Claims. (Cl. 43—42.5)

This invention relates to improvements in fishing lures.

The conventional fishing lure of the type under consideration consists of an elongated asymmetrical plate, generally in the shape of a spoon and formed with an aperture at its inner end for the attachment of a leader, there also being an aperture at its outer end to which is connected a suitable fish hook.

The degree to which a lure of this type is successful in attracting fish and enticing them to strike is dependent upon the action of the lure through the water, it being desirable for it to wobble and move in an irregular path.

It is, therefore, a general object of the present invention to provide an improved fishing lure which is so constructed that, when in use, it will dart about, wobble and generally move in an irregular path with much greater facility and enticing action than is the case with conventional lures.

A further object of the invention is to provide an improved fishing lure in which the hook thereof is susceptible of a relatively great range of movement relative to the main portion of the lure.

A further object of the invention is to provide an improved fishing lure in which the movement of the hook relative to the main portion of the lure is greatly facilitated and enhanced.

A still further object of the invention is to provide an improved fishing lure which is particularly adapted for use with an additional bait such as a pork rind or buck tail attached to the hook thereof, and which, when so used, darts about, turns and swings to a much greater extent than do other lures of this general type.

With the above and other objects in view, the invention consists of the improved fishing lure, and all its parts and combinations, as set forth in the claims, and all equivalents thereof.

In the accompanying drawing, illustrating one complete embodiment of the preferred form of the invention, in which the same reference numerals designate the same parts in all of the views:

Fig. 1 is a front view of the improved fishing lure;

Fig. 2 is a side view thereof; and,

Fig. 3 is a sectional view taken on line 3—3 of Fig. 1.

Referring more particularly to the drawing, the numeral 5 designates an elongated asymmetrical plate which forms the main portion of the lure. The plate 5 is concavo-convex in cross section and is rounded at either end. From the rounded outer end 6 the width of the plate 5 tapers to a smaller rounded inner end 7. The plate 5 is curved substantially in the plane of the edges thereof so that the inner end 7 is offset laterally from the outer end 6 thereof in the above-mentioned plane. In the inner end of plate 5 is a relatively small aperture 8 by means of which the lure is connected to a suitable leader (not shown).

A relatively wide arcuate slot 9 is positioned adjacent the outer peripheral edge of the plate 5. Said slot 9 extends substantially the whole width of the lower end of the plate 5 and follows the radius of the periphery of the curved outer end 6 of the plate. Adapted to depend from plate 5 is a conventional multi-prong hook 10 which is formed with a relatively large connecting loop 12 and which is turnably, swingably and arcuately slidably connected to said plate 5 at the slot 9 by means of a relatively large ring 11.

From the above description, it is apparent that the lure of the present invention differs from the conventional lures of the generally spoon shaped type, not only in its general shape, but in the employment of the relatively long arcuate slot 9 in conjunction with the relatively large ring 11 and the relatively large connecting loop 12. The latter features are of very great importance in accomplishing the objects of the present invention in providing for unusual action of the spoon, hook and any additional bait attached thereto.

It will be noted from the description and the drawing that the hook 10 is afforded a very broad range of movement relative to the plate 5 because of the length and shape of the slot 9, and the size of the connecting ring 11. Because of the width of the slot 9, and the relatively large diameter of both the connecting ring 11 and the connecting loop 12 of the hook 10, the hook 10 is susceptible of very great freedom and ease of movement throughout its broad range. There is no tendency for the hook 10 to become jammed in any position such as would reduce the effectiveness of the lure.

The construction of the present lure in providing the greatly increased range and facility of movement of the hook 10 relative to the plate 5 produces a movement, during use, which is extremely effective in attracting fish thereto. This relative independence of movement permits the plate 5 to move about in the water unusually freely. This relative freedom of movement is especially beneficial when some additional bait such as pork rind or a buck tail is used in connection with the present lure.

The features of the present invention are not necessarily limited to the particular embodiment shown in the drawing. Various changes and modifications may be made without departing from the spirit of the invention, and all of such changes are contemplated as may come within the scope of the claims.

What I claim is:

1. An artificial bait, comprising a lure member having a curved outer end portion, there being in said outer end portion an arcuate slot of substantially uniform width throughout which corresponds to the curvature of said outer end portion, a hook member, and a connecting ring carrying the hook member and engaging said slot to move therealong throughout the entire extent of the slot.

2. An artificial bait, comprising a lure member having a curved outer end portion, there being in said outer end portion an arcuate slot corresponding to the curvature of said outer end portion, a hook member, and a connecting ring carrying the hook member and engaging said slot in such a manner as to be freely movable throughout the entire length thereof, said ring also being susceptible of turning movement.

3. An artificial bait, comprising an asymmetrically shaped spoon lure member having a uniformly curved outer end portion, there being in said outer end portion a uniformly shaped arcuate slot concentric with the curvature of the edge of said outer end portion, a hook member formed with a large connecting loop, and a large connecting ring engaging said loop and engaging said slot in such a manner as to be freely movable throughout the entire length thereof, said ring also being susceptible of turning movement.

MAXIMILLIAN P. JANISCH.

REFERENCES CITED

The following references are of record in the file of this patent:

UNITED STATES PATENTS

| Number | Name | Date |
|---|---|---|
| 1,594,798 | Skelly et al. | Aug. 3, 1926 |
| 1,770,003 | Miller | July 8, 1930 |
| 1,831,267 | Schwarz | Nov. 10, 1931 |
| 2,000,734 | Accetta | May 7, 1935 |
| 2,238,900 | Hadaway | Apr. 22, 1941 |

FOREIGN PATENTS

| Number | Country | Date |
|---|---|---|
| 879,466 | France | Nov. 19, 1942 |
| 669,344 | Germany | Dec. 21, 1937 |